United States Patent
Ohara

(10) Patent No.: US 11,290,972 B2
(45) Date of Patent: Mar. 29, 2022

(54) USER DEVICE AND BASE STATION APPARATUS

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 16/968,218

(22) PCT Filed: Feb. 15, 2018

(86) PCT No.: PCT/JP2018/005357
§ 371 (c)(1),
(2) Date: Aug. 7, 2020

(87) PCT Pub. No.: WO2019/159304
PCT Pub. Date: Aug. 22, 2019

(65) Prior Publication Data
US 2021/0037487 A1    Feb. 4, 2021

(51) Int. Cl.
*H04W 56/00* (2009.01)
*H04W 72/04* (2009.01)
*H04W 74/08* (2009.01)

(52) U.S. Cl.
CPC ....... *H04W 56/001* (2013.01); *H04W 72/042* (2013.01); *H04W 72/044* (2013.01); *H04W 74/0833* (2013.01)

(58) Field of Classification Search
CPC ............ H04W 56/001; H04W 72/042; H04W 72/044; H04W 74/0833; H04W 74/006; H04W 16/28; H04W 72/0453; H04W 74/004
See application file for complete search history.

(56) References Cited

U.S. PATENT DOCUMENTS

| | | |
|---|---|---|
| 9,350,502 B2 | 5/2016 | Chun et al. |
| 2017/0215207 A1 | 7/2017 | Yi et al. |
| 2017/0339704 A1 | 11/2017 | Matsumoto et al. |

(Continued)

FOREIGN PATENT DOCUMENTS

| | | |
|---|---|---|
| WO | 2016/121730 A1 | 8/2016 |
| WO | 2019097653 A1 | 5/2019 |
| WO | 2019160659 A1 | 8/2019 |

OTHER PUBLICATIONS

Patent examination report issued in New Zealand Application No. 766935; dated Jul. 23, 2021 (5 pages).

(Continued)

*Primary Examiner* — Kyaw Z Soe
(74) *Attorney, Agent, or Firm* — Osha Bergman Watanabe & Burton LLP

(57) ABSTRACT

A terminal is disclosed including a receiver that receives synchronization blocks and an indication triggering contention free random access from a base station apparatus; a processor that identifies a synchronization block, a random access preamble and a random access channel occasion for use in the contention free random access based on the indication triggering contention free random access; and a transmitter that transmits the identified random access preamble to the base station apparatus by use of the identified synchronization block and the identified random access channel occasion. In other aspects, a base station apparatus is also disclosed.

6 Claims, 10 Drawing Sheets

(56) References Cited

U.S. PATENT DOCUMENTS

| | | | |
|---|---|---|---|
| 2018/0206241 A1 | 7/2018 | Matsumoto et al. | |
| 2019/0159261 A1* | 5/2019 | Jung | H04W 48/08 |
| 2020/0252971 A1* | 8/2020 | Wu | H04L 5/0053 |
| 2021/0176787 A1 | 6/2021 | Ohara | |

OTHER PUBLICATIONS

3GPP TSG-RAN2 Meeting #100; R2-1712326 "Remaining issues for BWP" Huawei, HiSilicon; Reno, USA; Nov. 27-Dec. 1, 2017 (4 pages).

Office Action issued in Russian Application No. 2020128554/07; dated Jul. 13, 2021 (12 pages).

International Search Report issued in Application No. PCT/JP2018/005357, dated May 15, 2018 (5 pages).

Written Opinion issued in International Application No. PCT/JP2018/005357, dated May 15, 2018 (4 pages).

3GPP TS 36.213 V14.5.0, Release 14; "3rd Generation Partnership Project; Technical Specification Group Radio Access Network; Evolved Universal Terrestrial Radio Access (E-UTRA); Physical layer procedures;" Dec. 2017 Sophia Antipolis Valbonne, France (449 pages).

3GPP TS 36.211 V14.5.0, Release 14; "3rd Generation Partnership Project; Technical Specification Group Radio Access Network; Evolved Universal Terrestrial Radio Access (E-UTRA); Physical channels and modulation;" Dec. 2017; Sophia Antipolis Valbonne, France (197 pages).

3GPP TSG RAN WG1 Meeting AH 1801; R1-1800898; "Remaining details on the RACH procedure;" Ericsson Jan. 22-26, 2018; Vancouver, Canada (10 pages).

Office Action in counterpart Japanese Application No. 2019-571899 dated Oct. 19, 2021 (5 pages).

Qualcomm Incorporated; "Remaining Details on RACH Procedure"; 3GPP TSG-RAN WG1 Meeting #91, R1-1720653 Reno, Nevada, USA; Nov. 27-Dec. 2, 2017 (24 pages).

NTT Docomo, Inc.; "Remaining details on RACH procedure"; 3GPP TSG RAN WG1 Meeting #91, R1-1720795; Reno, USA, Nov. 27-Dec. 1, 2017 (11 pages).

LG Electronics Inc.; "Clarification on RA procedure'" 3GPP TSG-RAN WG2 NR Ad hoc 1801, R2-1801478; Vancouver, Canada, Jan. 22-26, 2018 (7 pages).

Office Action in counterpart Korean Application No. 10-2020-7024049 dated Sep. 1, 2021 (9 pages).

Qualcomm incorporated; "Open Issues on BWP" 3GPP TSG RAN WG1 #91, R1-1720693; Reno, NV, USA, Nov. 27-Dec. 1, 2017 (15 pages).

Samsung; "Corrections on PRACH procedure"; 3GPP TSG RAN WG1 Meeting AH 1801, R1-1800418; Vancouver, Canada, Jan. 22-26, 2018 (9 pages).

Office Action in counterpart Indian Application No. 202037038996 dated Sep. 10, 2021 (5 pages).

Extended European Search Report issued in counterpart European Patent Application No. 18905973.6, dated Sep. 17, 2021 (7 pages).

ZTE, Sanechips; "Remaining details of RACH procedure"; 3GPP TSG RAN WG1 Meeting AH 1801, R1-1800084; Vancouver, Canada; Jan. 22-26, 2018 (12 pages).

LG Electronics Inc.; "BWP switching for Rach"; 3GPP TSG-RAN WG2 NR AH, R2-1801246; Vancouver, Canada; Jan. 22-26, 2018 (2 pages).

Huawei, HiSilicon; "Remaining issues with multiple beam operation in RA"; 3GPP TSG-RAN2 Meeting #100, R2-1712904; Reno, USA; Nov. 27-Dec. 1, 2017 (6 pages).

Sharp; "Remaining issues on RACH preambles in NR"; 3GPPTSG RAN WG1 Meeting 91, R1-1720611; Reno, USA; Nov. 27-Dec. 1, 2017 (7 pages).

* cited by examiner

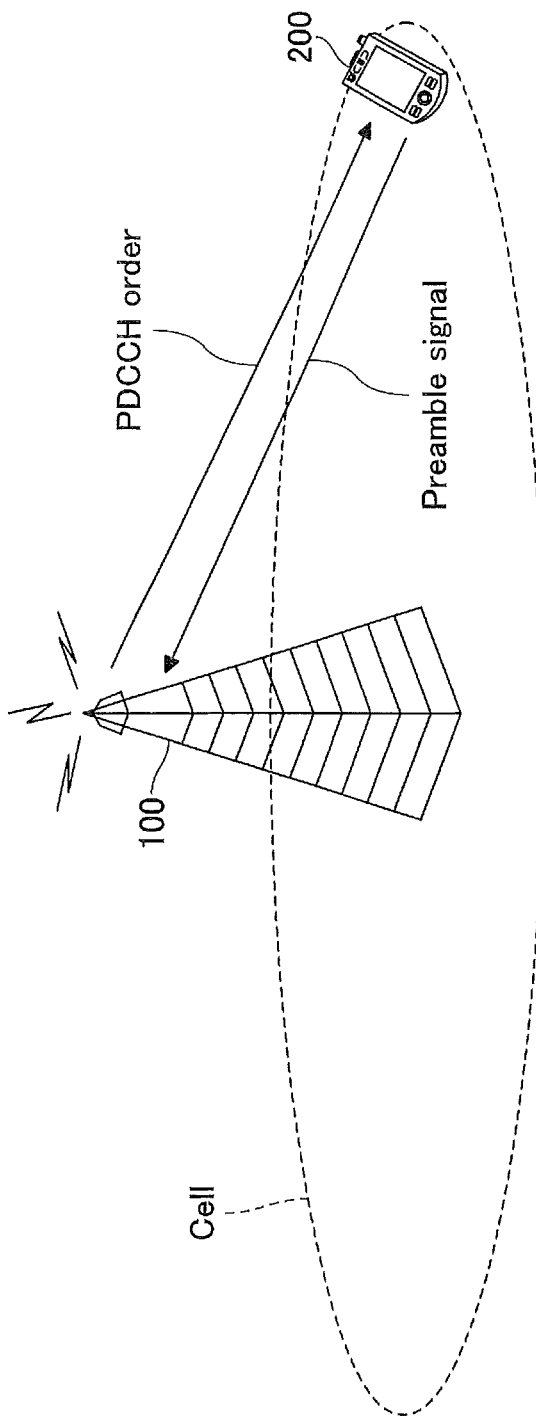

FIG.2

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity | Every, in the time domain, even PRACH opportunity |
| 12 | Every, in the time domain, odd PRACH opportunity | Every, in the time domain, odd PRACH opportunity |
| 13 | 1st PRACH Resource Index in subframe | 1st PRACH Resource Index in subframe |
| 14 | Reserved | 2nd PRACH Resource Index in subframe |
| 15 | Reserved | 3rd PRACH Resource Index in subframe |

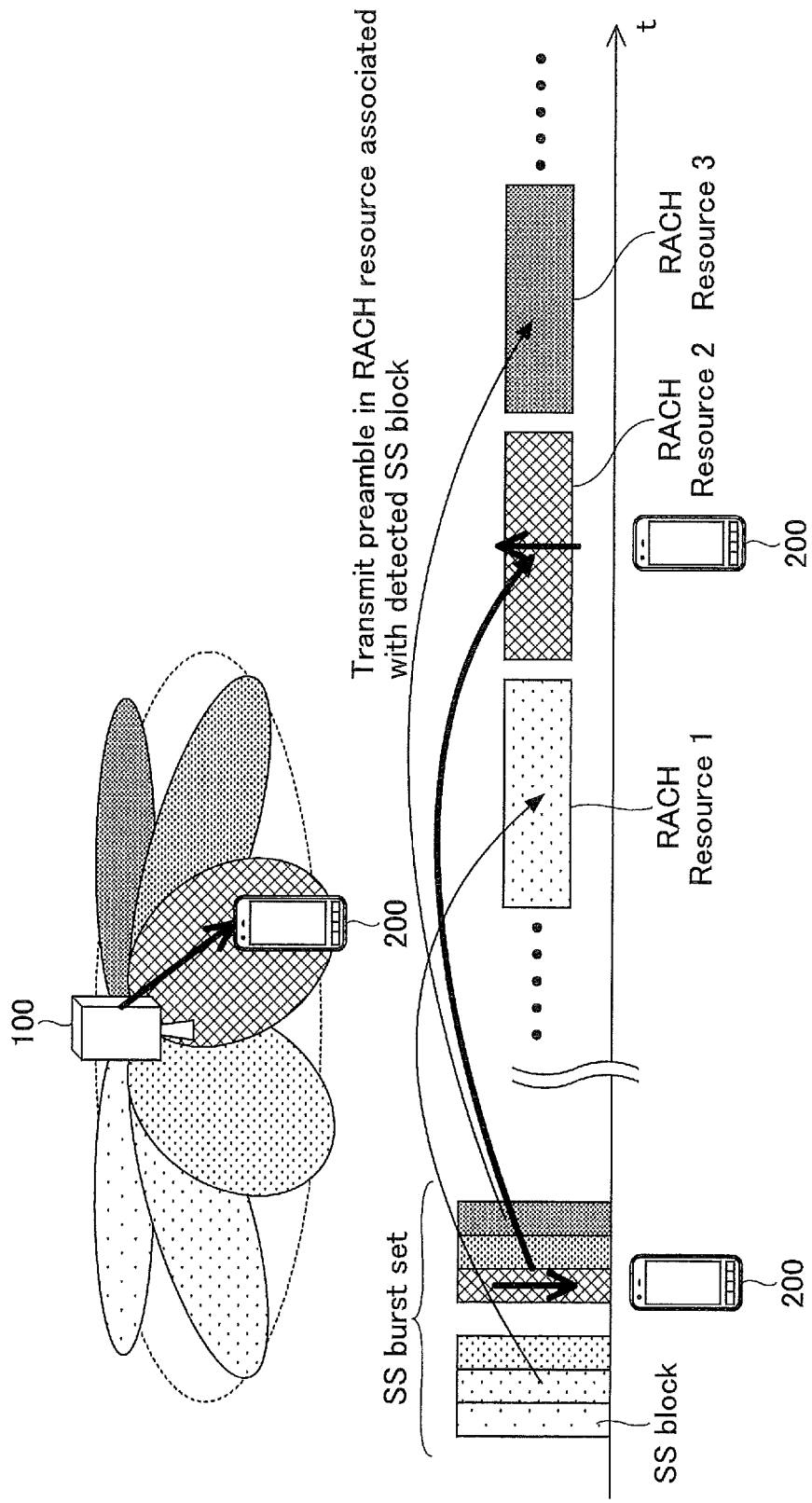

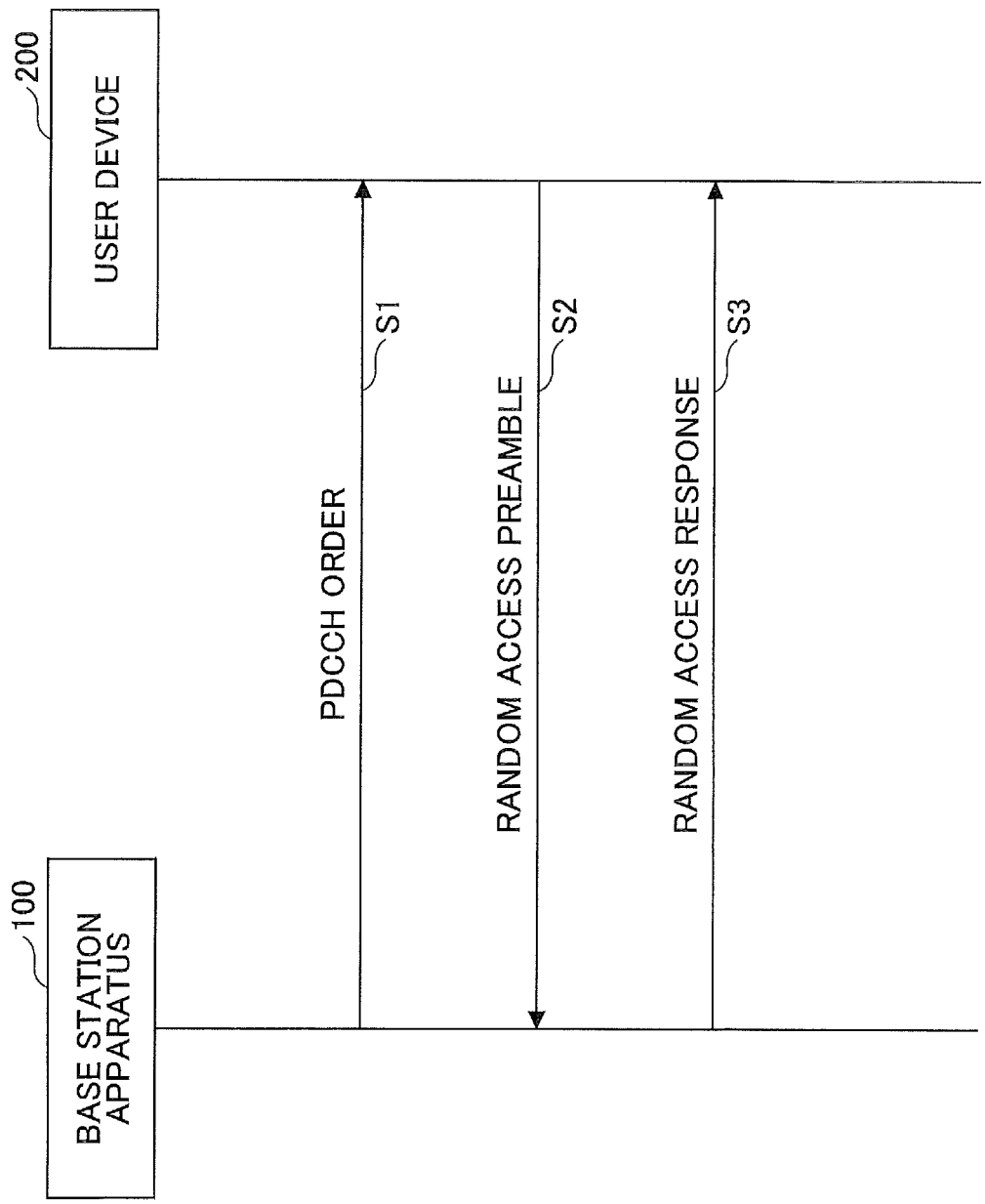

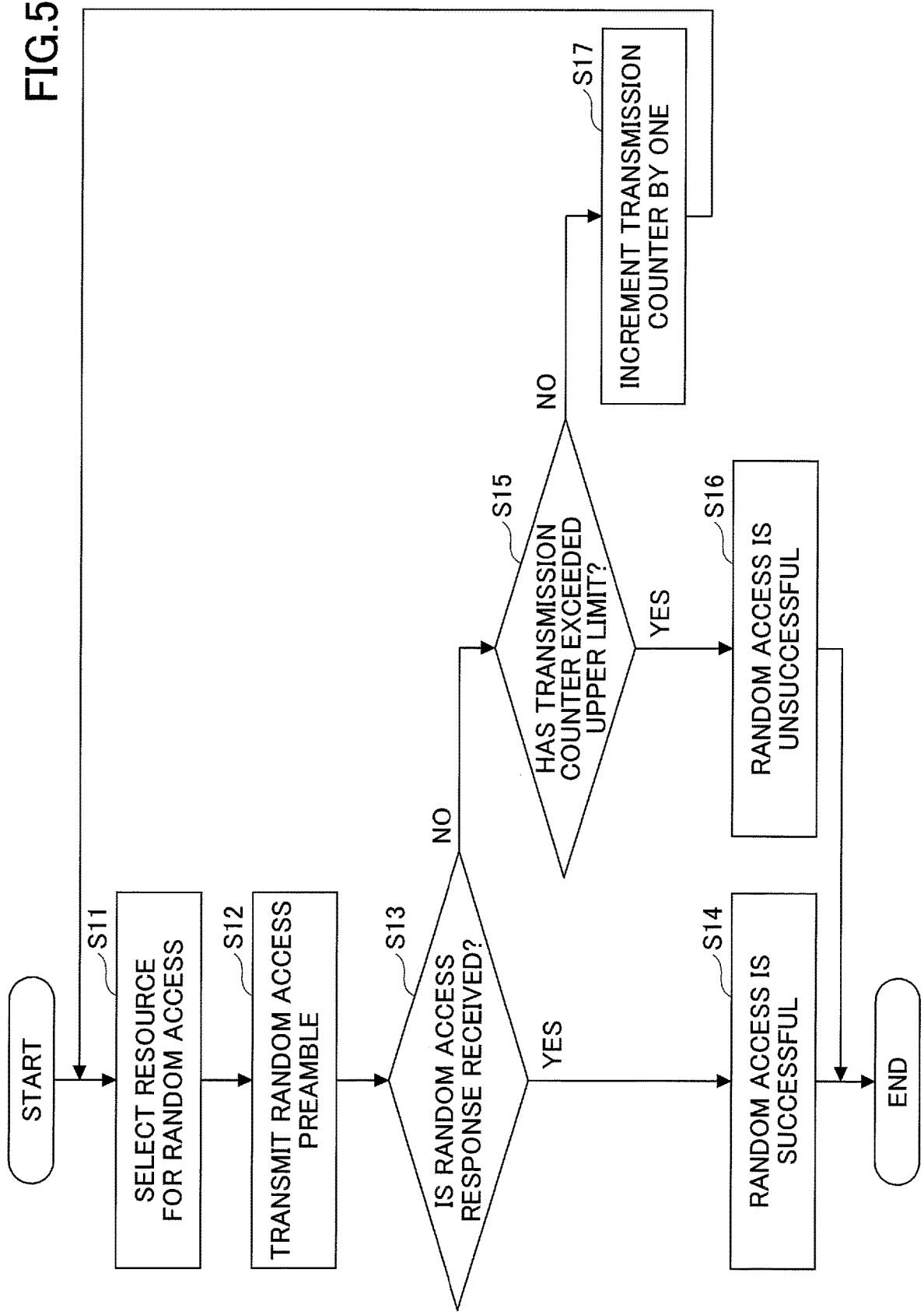

The number of SSBs per RACH occasion: 1/8
Mapping on condition that the number of SSBs is 3

FIG.6C
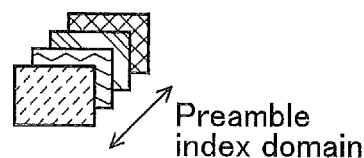
Preamble index domain
FIG.7
The number of SSBs per RACH occasion: 2
The number of SSBs: 8
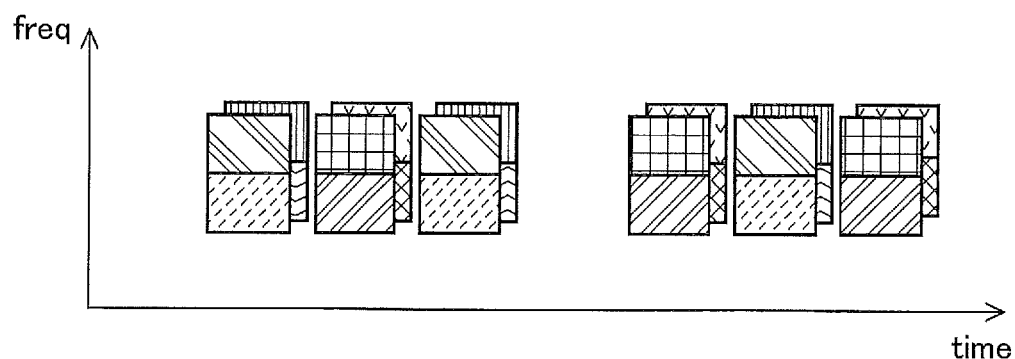
Mapping from SS blocks
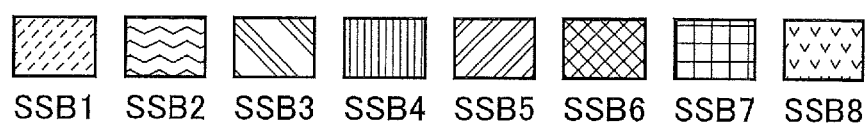
SSB1  SSB2  SSB3  SSB4  SSB5  SSB6  SSB7  SSB8

When 8 indexes are for CFRA among 32 preamble indexes

USER DEVICE AND BASE STATION APPARATUS

TECHNICAL FIELD

The present invention relates to a user device and a base station apparatus in a radio communication system.

BACKGROUND ART

At present, in 3GPP (Third Generation Partnership Project), development of a radio communication system has been in progress, which is referred to as 5G or NR (New Radio), in order to realize further enlargement of a system capacity, further increase of a data transmission speed, and further reduction of a delay in a radio section. (This radio communication system may be referred to hereinafter as "5G" or "NR".) In 5G, various techniques of radio communication have been studied to satisfy requirements of obtaining a throughput of 10 Gbps or more and keeping a delay in a radio section equal to or less than 1 ms.

In NR, a user device performs cell detection and cell identification by use of a synchronization signal transmitted by a base station apparatus, and obtains part of system information required for initial access, in the initial access at the time of establishing connection between the user device and the base station apparatus (for example, see Non-Patent Document 1).

Also, in NR, it is expected to use a wide frequency range, from a low frequency band similar to that for LTE (Long Term Evolution) to a higher frequency band than that for LTE. As a transmission loss increases particularly in the high frequency band, it is considered to apply beamforming with a small beam width to compensate for the transmission loss (for example, see Non-Patent Document 2).

RELATED-ART DOCUMENTS

Non-Patent Document

Non-Patent Document 1: 3GPP TS 36.213 V14.5.0 (2017-12)
Non-Patent Document 2: 3GPP TS 36.211 V14.5.0 (2017-12)

SUMMARY OF THE INVENTION

Problem to be Solved by the Invention

In NR, part of system information and a synchronization signal required for initial access are a resource unit referred to as an SS block (Synchronization Signal block), which is constituted by consecutive OFDM (Orthogonal Frequency Division Multiplexing) symbols, and is mapped to a radio frame. The user device receives the SS block transmitted by the base station apparatus, and obtains information required for initial access. The information required for the initial access includes information identifying a RACH (Random Access Channel) resource and a preamble signal form.

Furthermore, a base station apparatus in NR transmits a plurality of beams by application of beamforming. The user device receives an SS block associated with these beams, and obtains information required for initial access. The RACH resource is associated with the SS block.

In a case of notifying a user device of a RACH resource for use in contention free random access triggered by a PDCCH order from a base station apparatus, it is necessary to identify information for identifying the RACH resource, namely, a position of the RACH resource in a time domain and a frequency domain, a preamble index, an associated SS block and the like.

Also, it is necessary in NR to notify or predetermine in which BWP (Bandwidth Part) the user device performs a random access procedure, because a RACH configuration is expected for each BWP.

The present invention has been made in view of the above-described problem, and an object of the present invention is appropriately to notify a user device of a RACH resource for use in a random access procedure in NR.

Means to Solve the Problem

According to a disclosed technique, a user device for communication with a base station apparatus is provided, including a reception unit configured to receive a plurality of synchronization blocks and a PDCCH order from the base station apparatus, a control unit configured to select a synchronization block from the plurality of synchronization blocks for use in contention free random access based on the PDCCH order, and identify a random access preamble and a random access channel resource in a manner based on the PDCCH order, and a transmission unit configured to transmit the identified random access preamble to the base station apparatus by use of the selected synchronization block and the identified random access channel resource.

Advantage of the Invention

According to the disclosed technique, it is possible appropriately to notify a user device of a RACH resource for use in a random access procedure in NR.

BRIEF DESCRIPTION OF THE DRAWINGS

FIG. 1 is a view illustrating a configuration arrangement in a radio communication system in the embodiment of the present invention.
FIG. 2 is a chart illustrating an example of identifying a RACH resource in a time domain.
FIG. 3 is a chart for describing the RACH resource associated with an SS block in the embodiment of the present invention.
FIG. 4 is a sequence chart for describing an example of a random access procedure in the embodiment of the present invention.
FIG. 5 is a flow chart for describing the example of the random access procedure in the embodiment of the present invention.
FIG. 6C is a view illustrating an example (1) of mapping between SS blocks and preamble indexes in the embodiment of the present invention.
FIG. 7 is a view illustrating an example (3) of mapping between SS blocks and RACH resources in the embodiment of the present invention.

MODE FOR CARRYING OUT THE INVENTION

Figure 6A:
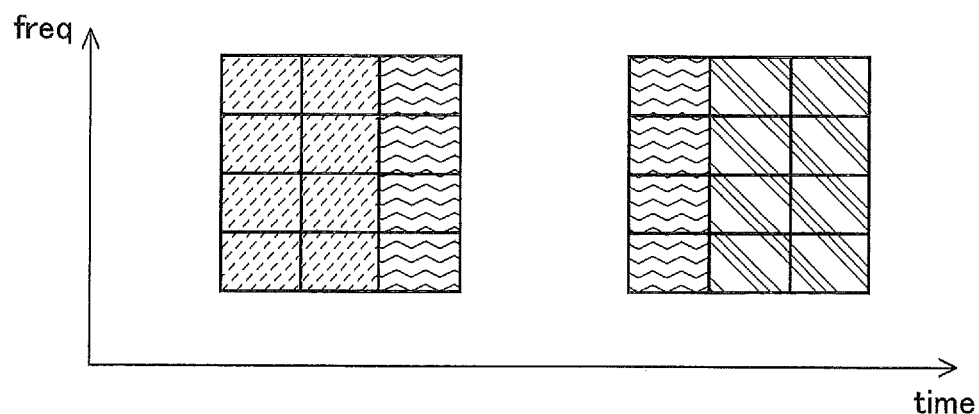
FIG. 6A is a view illustrating an example (1) of mapping between SS blocks and RACH resources in the embodiment of the present invention.

An embodiment of the present invention is described below by referring to the drawings. Note that the embodiment described below is only one example, and the embodiment to which the present invention is applied is not limited to the following embodiment.

For the operation of a radio communication system of the embodiment of the present invention, existing techniques are used suitably. However, those existing techniques are, for example, the existing LTE, but are not limited to the existing LTE. The term "LTE" used in the present specification should be read to have a broad meaning inclusive of LTE-Advanced and systems later than LTE-Advanced (for example, NR), unless otherwise mentioned.

In the embodiment of the present invention to be described hereinafter, terms used in the existing LTE are used, including SS (Synchronization Signal), PSS (Primary SS), SSS (Secondary SS), PBCH (Physical broadcast channel), PRACH (Physical RACH) and the like. Those are for the convenience in the description. Signals, functions and the like similar to those may be referred to with other names.

In the embodiment of the present invention, duplex systems may be a TDD (Time Division Duplex) system, FDD (Frequency Division Duplex) system, or others (for example, Flexible Duplex or the like). In the description below, a method of transmitting a signal with a transmission beam may be transmission of a signal multiplied by a predetermined precoding vector (precoded by the precoding vector). Similarly, a method of receiving a signal with a reception beam may be multiplication of a received signal by a predetermined weight vector. Also, transmitting a signal with a transmission beam may be expressed as transmission of the signal through a particular antenna port. Similarly, receiving a signal with a reception beam may be expressed as reception of the signal through a particular antenna port. The term of antenna port means a logical antenna port as defined in 3GPP standards or a physical antenna port. Methods of forming a transmission beam and reception beam are not limited to those methods described above. For example, a method of changing an angle of each antenna in a user device 200 or a base station apparatus 100 with plural antennas may be applied. A method of combining a method of using a precoding vector and a method of changing the angle of the antenna may be applied. Different antenna panels may be switched and utilized. A method of combining methods of using plural combined antenna panels may be applied. Other methods may be applied. Also, plural transmission beams different from one another may be used in, for example, a high frequency band. Using plural transmission beams is referred to as multi-beam operation. Using a single transmission beam is referred to as single beam operation.

FIG. 1 is a view for describing a communication system in the embodiment of the present invention. The radio communication system in the embodiment of the present invention includes the base station apparatus 100 and the user device 200 as illustrated in FIG. 1. In FIG. 1, the base station apparatus 100 and the user device 200 are illustrated respectively singly. However, these are examples. The base station apparatus 100 and the user device 200 may be respectively plural devices.

The base station apparatus 100 is a communication device which provides one or more cells, and communicates with the user device 200 wirelessly. As illustrated in FIG. 1, the base station apparatus 100 transmits a synchronization signal and system information to the user device 200. For example, the synchronization signal is NR-PSS and NR-SSS. The system information is transmitted, for example, by an NR-PBCH. Also, the system information is referred to as notification information. Both of the base station apparatus 100 and the user device 200 can transmit and receive a signal by performing beamforming. The user device 200 is a communication device having a radio communication function, such as a smartphone, mobile phone, tablet, wearable terminal, M2M (Machine-to-Machine) communication module, and the like, and wirelessly connects to the base station apparatus 100, and utilizes various communication services provided by the radio communication system. In the step of the initial access, the user device 200 as illustrated in FIG. 1 transmits a preamble signal of random access to the base station apparatus 100. This random access is performed on the basis of RMSI (Remaining minimum system information) that is system information according to an NR-PDSCH (Physical downlink shared channel) which is scheduled by an NR-PDCCH (Physical downlink control channel), in addition to the system information according to the NR-PBCH received from the base station apparatus 100. For example, the RMSI includes information required for initial access, such as RACH configuration and the like.

FIG. 2 is a chart illustrating an example of identifying RACH resources in a time domain. In FIG. 2, an example of "PRACH Mask Index" identifying RACH resources in the time domain is illustrated. The "PRACH Mask Index" is information for notifying the user device 200 which RACH resource is usable in the time domain among RACH resources identified by a RACH configuration index.

In a PRACH in FDD in the example of FIG. 2, the following can be configured, namely, 10 indexes from the PRACH Resource Index 0 to PRACH Resource Index 9, PRACH transmission opportunities of even numbers as counted from a first PRACH in a subframe, and PRACH transmission opportunities of odd numbers as counted from the first PRACH in the subframe.

In a PRACH in TDD in the example of FIG. 2, the following are usable, namely, 6 indexes from the PRACH Resource Index 0 to PRACH Resource Index 5, PRACH transmission opportunities of even numbers as counted from a first PRACH in a subframe, PRACH transmission opportunities of odd numbers as counted from the first PRACH in the subframe, a first PRACH Resource Index of the subframe, a second PRACH Resource Index of the subframe, and a third PRACH Resource Index of the subframe.

FIG. 3 is a chart for describing RACH resources associated with SS blocks in the embodiment of the present invention. In NR as illustrated in FIG. 3, an SS burst set including an SS block (hereinafter referred to as "SSB")

associated with a beam is transmitted by the base station apparatus 100. The user device 200 receives a detectable SSB, and transmits a preamble in a RACH resource associated with the received SSB, to start an initial access procedure. The RACH resource may be associated with the beam.

In an example illustrated in FIG. 3, the user device 200 receives a fourth SSB included in the SS burst set. RACH resource 2 associated with the fourth SSB transmits a preamble. In the example illustrated in FIG. 3, a second SSB included in the SS burst set is associated with RACH resource 1. A sixth SSB included in the SS burst set is associated with RACH resource 3. There is an SSB index corresponding to an SSB. For example, an SSB index of the fourth SSB included in the SS burst set is defined as "4".

FIG. 4 is a sequence chart for describing an example of a random access procedure in the embodiment of the present invention. In a step S1, a PDCCH order (hereinafter referred to as "PDCCH order") is notified by the base station apparatus 100 to the user device 200. The PDCCH order is, for example, to trigger a random access procedure in the user device 200 from a network for recovering synchronization if the user device 200 in a connected state (Connected mode) is likely to be out of a UL (Uplink) synchronization. Also, in LTE, for example, information identifying a RACH resource and preamble index, such as a preamble index (6-bit) and PRACH mask index (4-bit) described by referring to FIG. 2, is notified to the user device 200 by use of the DCI (Downlink Control Information) format 1A through the PDCCH order. The information identifying the RACH resource and preamble index described above can be notified by RRC (Radio Resource Control) signaling.

Contention free random access can be performed by the user device 200 performing a random access procedure using the preamble index specified in the above-described manner. It is noted in a case of contention based random access that a preamble for random use is selected from preamble indexes of a predetermined range.

Also, it is possible in NR that a configuration related to a RACH including information identifying a RACH resource and preamble index described above is configured for each BWP. In NR, a BWP corresponds to a position and width of a usable band notified to the user device 200 in a carrier bandwidth of respectively DL (Downlink) or UL. For example, it is intended that one or a plurality of BWPs are configured semi-statically by RRC, and that any one of the BWPs is configured actively by DL or UL respectively. An active BWP can be switched by the DCI, timer or the like. An "Initial active BWP" is a BWP to be used by the user device 200 in an idle state for initial access. In short, the initial access is performed in this BWP. A "Default BWP" is a BWP to be switched when an active BWP timer expires or the like.

In a step S2, the user device 200 transmits a random access preamble to the base station apparatus 100 according to the information identifying the RACH resource and preamble index as obtained in step S1.

In a step S3, the base station apparatus 100 transmits a random access response to the user device 200. The random access response is a response to a random access preamble, is transmitted to an address of an RA-RNTI (Random Access-Radio Network Temporary Identifier) through a PDCCH, and includes at least an identifier of the random access preamble, timing alignment, and initial uplink grant. In a case of contention free random access, the random access procedure is terminated in the step S3.

FIG. 5 is a flow chart for describing an example of a random access procedure in the embodiment of the present invention. FIG. 5 is a view illustrating one example of a random access procedure in the user device 200. The base station apparatus 100 transmits a PSS, SSS and PBCH to the user device 200. The PBCH includes part of system information. It is noted that a transmission counter is set to "1" at the start of the random access procedure.

In a step S11, the user device 200 selects a resource for use in random access according to a resource for performing the random access procedure received from the base station apparatus 100, namely, according to a RACH resource identified by a frequency domain and time domain, and information identifying the preamble format and the like. Then the user device 200 transmits a random access preamble by use of the selected resource (S12). Configuring power for transmitting the random access preamble will be described later.

In a step S13, the user device 200 receives a random access response from the base station apparatus 100. The random access response is a response to the random access preamble. If the user device 200 receives the random access response (yes in S13), the flow proceeds to a step S14. If the user device 200 does not receive a random access response (no in S13), the flow proceeds to a step S15.

In the step S14, the user device 200 terminates the random access procedure by considering that random access is successful.

In the step S15, the user device 200 determines whether the transmission counter has exceeded a notified or predetermined upper limit. If the counter has exceeded the upper limit (yes in S15), the flow proceeds to a step S17. If the counter has not exceeded the upper limit (no in S15), the flow proceeds to a step S17.

In the step S16, the user device 200 terminates the random access procedure by considering that random access is unsuccessful. Also, in the step S17, the user device 200 increments the transmission counter by one, returns to the step S11 for retransmitting the random access preamble, and performs selection of a random access resource again.

FIG. 6A is a view illustrating an example (1) of mapping between SS blocks and RACH resources in the embodiment of the present invention. The number of SSBs per one "RACH occasion" (hereinafter referred to as "RACH transmission occasion") is configured as a parameter related to mapping of the SSBs and RACH resources. The number of SSBs per one RACH transmission occasion may be, for example, ⅛, ¼, ½, 1, 2, 4, 8 and 16. One RACH transmission occasion corresponds to a RACH resource with which one RACH can be transmitted in a frequency domain and time domain. For mapping of the SSBs and RACH resources, the preamble index is prioritized first, and the frequency domain is prioritized second, and the time domain is prioritized third.

FIG. 6A is an example in which the number of SSBs to be mapped to one RACH transmission occasion is ⅛, and the total number of SSBs is three. As illustrated in FIG. 6A, one SSB corresponds to eight RACH transmission occasions, so that the number of SSBs to be mapped to one RACH transmission occasion is ⅛. Eight RACH transmission occasions are mapped to each of the three SSBs different from one another, which are depicted with different hatching.

Figure 6B:
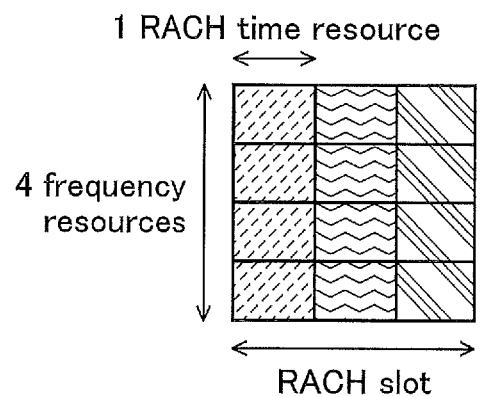
FIG. 6B is a view illustrating an example (2) of mapping between SS blocks and RACH resources in the embodiment of the present invention.

FIG. 6B is a view illustrating an example (2) of mapping between SS blocks and RACH resources in the embodiment of the present invention. FIG. 6B is an example schematically illustrating a RACH resource corresponding to each one slot in a radio frame. It is possible to refer to a RACH resource corresponding to each one slot as a RACH slot. To each one slot, four resources correspond in a frequency domain, and three resources correspond in a time domain. 12 RACH resources are included totally.

FIG. 6C is a view illustrating an example (1) of mapping between SS blocks and preamble indexes in the embodiment of the present invention. FIG. 6C is an example in which SSBs are mapped in a preamble index domain. 64 preamble indexes correspond to 1 RACH resource. 64 preamble indexes are equally divided by the number of the SSBs and mapped. FIG. 6C is an example of mapping by division in four on a condition where the number of the SSBs is four. One box as depicted corresponds to 16 preamble indexes.

Furthermore, in mapping of preamble indexes, it is possible to allocate a status of either contention based random access (hereinafter referred to as CBRA) or contention free random access (hereinafter referred to as CFRA) for which preamble indexes are used. For example, it is possible to allocate the number of preambles for CBRA per one RACH transmission occasion. Methods of allocating the number of preambles for this CBRA may differ according to the number of SSBs per one RACH transmission occasion. For example, assuming that the number of SSBs per one RACH transmission occasion is ⅛, ¼, ½, 1 and 2, the number of preambles for CBRA may be allocated with granularity of 4 as the number of the preamble indexes is relatively high. Assuming that the number of SSBs per one RACH transmission occasion is 4, 8 and 16, the number of preambles for CBRA may be allocated with granularity of 1 as the number of the preamble indexes is relatively low.

For example, the number of SSBs per one RACH transmission occasion is 2, 64 preamble indexes are divided by 2 equally, to map 32 preamble indexes per one SSB. Furthermore, 4*6=24 is allocated to the number of preambles for CBRA, then 24 preamble indexes are for CBRA, and remaining 8 preamble indexes are for CFRA.

FIG. 7 is a view illustrating an example (3) of mapping between SS blocks and RACH resources in the embodiment of the present invention. FIG. 7 illustrates an example of mapping in which the number of resources in a frequency domain is 2, the number of SSBs per one RACH transmission occasion is 2, and the total number of SSBs is 8. As the number of the SSBs per one RACH transmission occasion is 2, two SSBs are mapped in a preamble index domain. SSB #3 and SSB #4 are mapped to RACH resources in a frequency domain next to RACH resources where SSB #1 and SSB #2 are mapped, because the preamble index is prioritized first, the frequency domain is prioritized second, and the time domain is prioritized third. Furthermore, for example, SSB #5 to SSB #8 are mapped to RACH resources in a time domain next to the RACH resources where SSB #1 to SSB #4 are mapped.

Figure 8A:
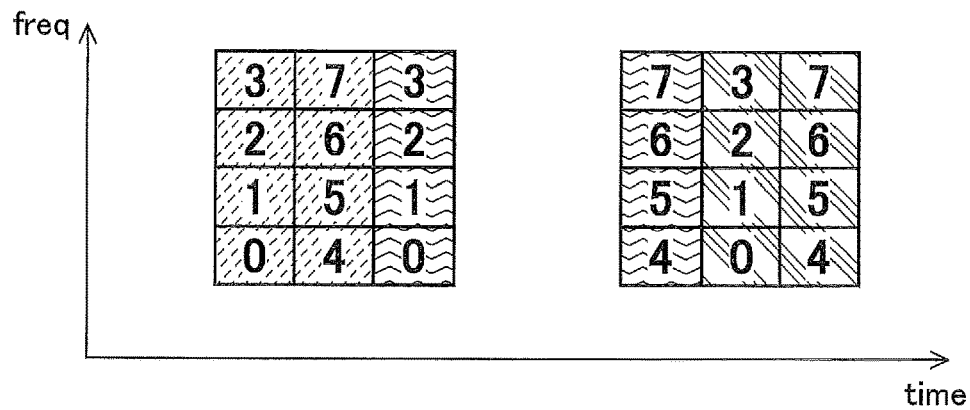
FIG. 8A is a view illustrating an example (4) of mapping between SS blocks and RACH resources in the embodiment of the present invention.

FIG. 8A is a view illustrating an example (4) of mapping between SS blocks and RACH resources in the embodiment of the present invention. An SSB to be used by the user device 200 may be selected in a random access procedure performed by the user device 200 in a connected state, inclusive of a random access procedure triggered by a PDCCH order, as follows:

1. Selection of an SSB of which an optimal reception quality or power has been measured.
2. Free selection.
3. Selection of an SSB having been selected most recently. For example, selection of an SSB which the user device 200 has selected for PRACH transmission or measurement.

It is herein noted that the base station apparatus 100 may notify the user device 200 of a relative position relative to a RACH resource group or preamble index group corresponding to each SSB. In other words, a relative position may be notified for each of the time domain, frequency domain or preamble index domain in relation to the respective SSBs.

FIG. 8A illustrates an example of notifying a relative position relative to the RACH resource group corresponding to each SSB. The number of SSBs mapped to one RACH transmission occasion is ⅛. The total number of the SSBs is three. As illustrated in FIG. 8A, 8 RACH resources correspond to one SSB. A position in the time domain and frequency domain can be notified with three bits. In short, notification to identify a RACH resource corresponding to one SSB is performed. Thus, it is possible to reduce an information amount further than notification identifying RACH resources corresponding to all the SSBs. As illustrated in FIG. 8A, RACH resources denoted by 3-bit indexes of 0-8 may be identified by prioritizing the frequency domain first and prioritizing the time domain second. It is noted that RACH resources denoted by the indexes may be identified by prioritizing the time domain first and prioritizing the frequency domain second. Which SSB is selected by the user device 200 is determined by 1., 2., and 3. described above. When one SSB is mapped to one RACH resource or less, three bits are unnecessary for resource allocation. For example, a different DCI format may be utilized to reduce an information amount for use in resource notification. In other words, an information amount for notifying a position of a RACH resource in the time domain and frequency domain may be changed according to the number of SSBs mapped for one RACH transmission occasion.

Figure 8B:
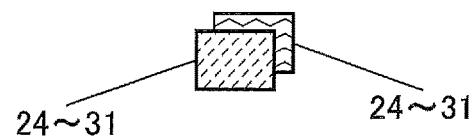
FIG. 8B is a view illustrating an example (1) of mapping between SS blocks and preamble indexes in the embodiment of the present invention.

FIG. 8B is a view illustrating an example (2) of mapping between SS blocks and preamble indexes in the embodiment of the present invention. FIG. 8B illustrates an example for notifying a relative position relative to a preamble index group associated to each SSB. The number of SSBs mapped to one RACH transmission occasion is two. Also, this is an example in which 8 preamble indexes are allocated to CFRA in 32 preamble indexes. In short, in the example illustrated in FIG. 8B, it is notified to the user device 200 which of 32 preamble indexes are used. The preamble index for use may be notified in a separate manner from information identifying a position in the time domain and frequency domain.

Also, as illustrated in FIG. 8B, if 32 preamble indexes are allocated to one SSB, the preamble indexes for CFRA have preamble indexes 24-31 for a first SSB, and have preamble indexes 24-31 for a second SSB. It is noted that preamble indexes for CFRA may be allocated on a side of larger values of preamble indexes, or allocated on a side of smaller values of preamble indexes, or allocated in any range.

Figure 9:
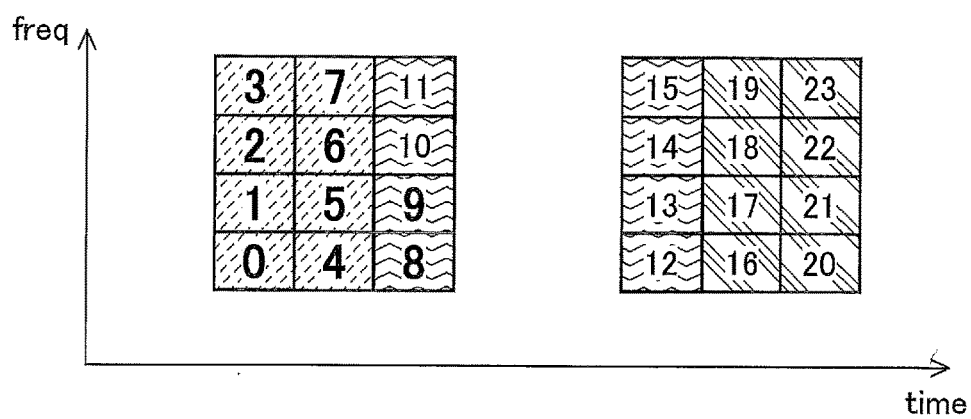
FIG. 9 is a view illustrating an example (5) of mapping between SS blocks and RACH resources in the embodiment of the present invention.

FIG. 9 is a view illustrating an example (5) of mapping between SS blocks and RACH resources in the embodiment of the present invention. An SSB for use in the random access may be notified to the user device 200 from the network. For example, the network may notify the user device 200 of an SSB index. Furthermore, as described by referring to FIG. 8A, the network may notify the user device 200 of a relative position relative to a RACH resource group or preamble index group corresponding to each SSB.

For example, as illustrated in FIG. 9, indexes may be mapped to all RACH resources, and may be notified through the network to the user device 200. Thus, SSBs to be used are implicitly identified in the user device 200 by these indexes. The user device 200 identifies a corresponding SSB from a RACH resource notified through the network, and transmits a PRACH according to this SSB.

It may be possible to switch operations of whether the user device 200 selects an SSB for use in random access, or whether the network notifies the user device 200 of an SSB for use in random access. For example, it is possible to designate which of the operations with information of one bit included in the PDCCH order. Furthermore, on the basis of this one bit, the user device 200 may determine whether information identifying a relative position relative to a RACH resource group associated with each SSB described by referring to FIGS. 8A and 8B is notified, or whether information identifying a position where indexes are mapped to all RACH resources described by referring to FIG. 9 is notified. Also, for example, it may be possible to predetermine switching between selection of an SSB for use in random access in the user device 200 and notification of an SSB for use in random access from the network to the user device 200, in a preliminary manner for switching. Furthermore, the user device 200 may switch the operation if a bit array included in the PDCCH order is made to be a certain specified bit array.

It is noted that, if no RACH is configured for an active UL-BWP when a PRACH transmission is triggered, then the user device 200 may switch to a default BWP to transmit a PRACH. Furthermore, if no RACH is configured for an active UL-BWP when a PRACH transmission is triggered, then the user device 200 may switch from an idle state to an "Initial active UL BWP" used for initial access, to transmit a PRACH. If there is no "Initial active UL BWP" in SCell (Secondary cell) or the like, the user device 200 may transmit a PRACH by switching to the default UL-BWP. Also, the base station apparatus 100 may notify a BWP index for use in PRACH transmission at the time of triggering PRACH transmission. In short, the base station apparatus 100 may notify the user device 200 of the PDCCH order or other RRC messages inclusive of the BWP index.

It is noted that the user device 200 may decode a random access response according to an RA-RNTI corresponding to the transmitted PRACH at the time of receiving a PDCCH where the random access response is scheduled, and may determine whether the random access response is to the PRACH transmitted by the user device 200. To this end, frequency indexes for respective BWPs may be used as frequency indexes for use in calculating the RA-RNTI. For example, the indexes may be at most 8, as the maximum number of the RACH frequency resources is 8 for the respective BWPs. In other words, the user device 200 may attempt reception of a random access response in an active DL-BWP by use of an RA-RNTI calculated using a frequency index in a UL-BWP where the PRACH has been transmitted.

Also, an RA-RNTI may be configured commonly for each BWP. For example, there are four BWPs to be configured simultaneously in the user device 200, the RA-RNTI may be calculated by 4*8=32 frequency indexes. Which of the indexes should correspond to one of BWPs may be determined by a BWP index determined in the user device 200. For example, eight frequency indexes corresponding to BWP index 0 may correspond to 0-7 among 32 frequency indexes of the RA-RNTI.

It is noted that, when a random access response is received by an RA-RNTI for each BWP, the user device 200 may transmit a PUSCH by applying UL scheduling information for next PUSCH transmission included in the random access response in a presently active UL-BWP. Also, the user device 200 may switch the active BWP to the UL-BWP where a PRACH has been transmitted, and may transmit a PUSCH by applying this UL scheduling information. Furthermore, the user device 200 may perform retransmission of a PRACH again if the UL-BWP has been switched before receiving this UL scheduling information after transmitting the PRACH.

Owing to the embodiment described above, the base station apparatus 100 can efficiently notify the user device 200 of an SSB, RACH resource and preamble index for use in contention free random access triggered by a PDCCH order. Also, the user device 200 can identify a UL-BWP for transmitting a random access preamble in contention free random access triggered by a PDCCH order.

In short, it is possible appropriately to notify the user device of a RACH resource for use in a random access procedure in NR.

Device Configuration

An example of a functional arrangement of the base station apparatus 100 and the user device 200 for performing tasks and operations described heretofore is described next. The base station apparatus 100 and the user device 200 include functions for executing the above-described embodiment. However, each of the base station apparatus 100 and the user device 200 may include only functions of part of the embodiment.

Base Station Apparatus 100

Figure 10:
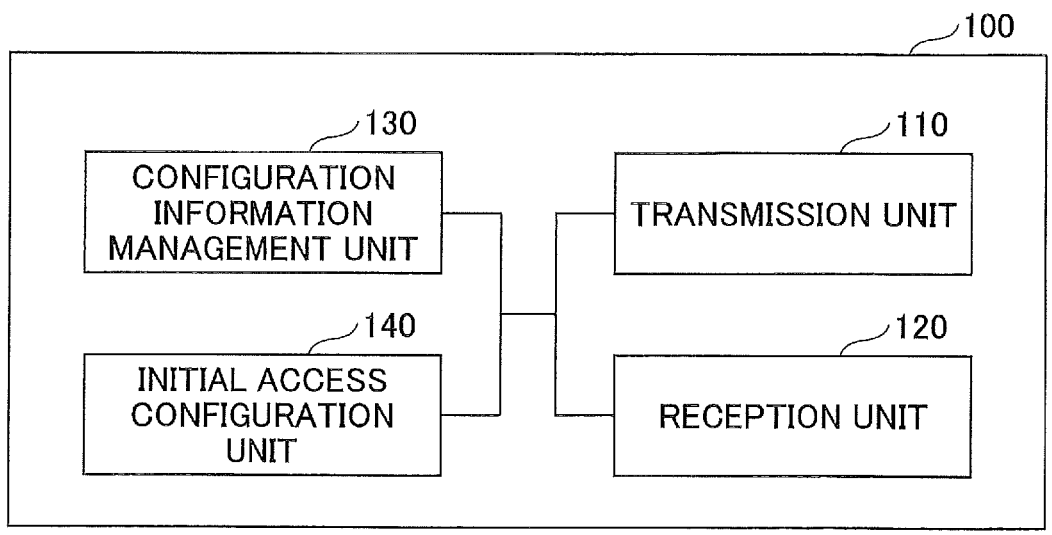
FIG. 10 is a diagram illustrating one example of a functional arrangement of a base station apparatus 100 in the embodiment of the present invention.

FIG. 10 is a diagram illustrating one example of a functional arrangement of the base station apparatus 100. As illustrated in FIG. 10, the base station apparatus 100 includes a transmission unit 110, a reception unit 120, a configuration information management unit 130 and an initial access configuration unit 140. The functional arrangement illustrated in FIG. 10 is only one example. Division of the functions and names of functional components can be determined optionally so that tasks related to the embodiment of the present invention can be performed.

The transmission unit 110 includes a function for generating a signal to transmit to the side of the user device 200, and for transmitting this signal wirelessly. The reception unit 120 has a function for receiving various types of signals transmitted by the user device 200, and obtaining information from the received signals, for example, information of a higher layer. Also, the transmission unit 110 has a function for transmitting an NR-PSS, NR-SSS, NR-PBCH, DL/UL control signal and the like to the user device 200. For example, the transmission unit 110 transmits UL scheduling or notification information to the user device 200, the notification information including information for use in the initial access. The reception unit 120 has a function of receiving a RACH preamble from the user device 200.

The configuration information management unit 130 stores predetermined configuration information, and various items of configuration information to be transmitted to the user device 200. Contents of the configuration information are, for example, information related to transmission/reception parameters for initial access or the like.

As has been described in the embodiment, the initial access configuration unit 140 notifies the user device 200 of information for use in initial access, and performs tasks upon receiving a random access preamble transmitted by the user device 200, transmission of a random access response, and the like.

User Device 200

Figure 11:
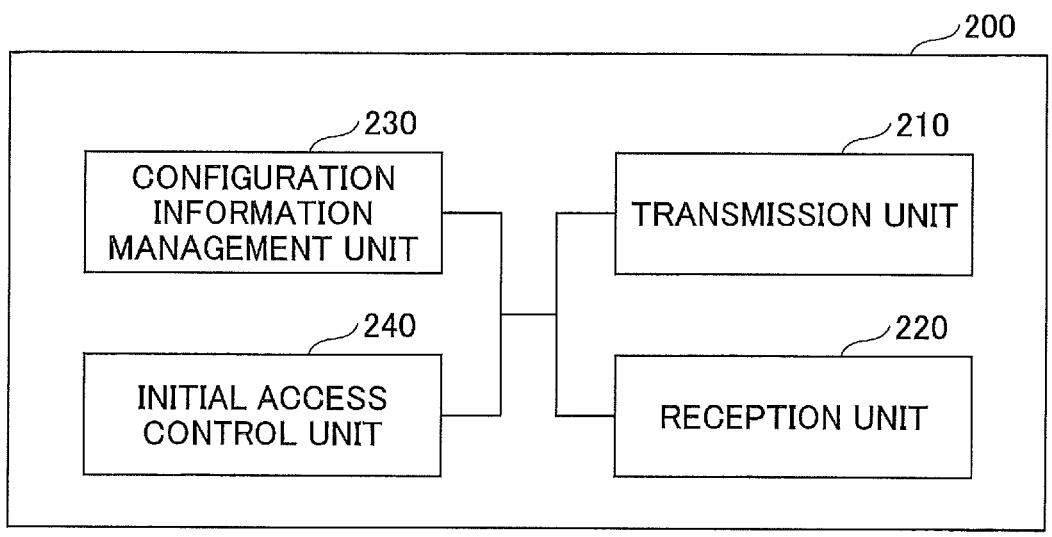
FIG. 11 is a diagram illustrating one example of a functional arrangement of a user device 200 in the embodiment of the present invention.

FIG. 11 is a diagram illustrating one example of a functional arrangement of the user device 200. As illustrated in FIG. 11, the user device 200 includes a transmission unit 210, a reception unit 220, a configuration information management unit 230 and an initial access control unit 240. The functional arrangement illustrated in FIG. 11 is only one example. Division of the functions and names of functional components can be determined optionally so that tasks related to the embodiment of the present invention can be performed.

The transmission unit 210 generates a signal for transmission from data for transmission, and wirelessly transmits this signal for transmission. The reception unit 220 wirelessly receives various signals, and obtains signals of higher layers from the received signals of the physical layer. Also, the reception unit 220 has functions for receiving an NR-PSS, NR-SSS, NR-PBCH, DL/UL/SL control signal and the like transmitted by the base station apparatus 100. Also, for example, the transmission unit 210 has functions for transmitting an NR-PRACH, NR-PUSCH and the like to the base station apparatus 100.

The configuration information management unit 230 stores various items of the configuration information received by the reception unit 220 from the base station apparatus 100 or the user device 200. Also, the configuration information management unit 230 stores predetermined configuration information. Contents of the configuration information are, for example, information related to transmission/reception parameters for initial access or the like.

As has been described in the embodiment, the initial access control unit 240 generates a preamble and a message related to initial access for transmission from the user device 200 to the base station apparatus 100. Also, the initial access control unit 240 controls power for transmission of a preamble related to the initial access. Functional components in the initial access control unit 240 related to signal transmission may be included in the transmission unit 210. Functional components in the initial access control unit 240 related to signal reception may be included in the reception unit 220.

Hardware Configuration

The views for the functional arrangement (FIGS. 10 and 11) used for describing the above-described embodiment of the present invention illustrate blocks in units of functions. These functional blocks (components) are implemented by any combination of hardware and/or software. Furthermore, means for implementing each functional block is not particularly limited. Namely, each functional block may be implemented by a single device with plural elements that are physically and/or logically coupled, or may be implemented by plural devices obtained by directly and/or indirectly (e.g., by wire and/or wirelessly) connecting the two or more devices separated physically and/or logically.

Figure 12:
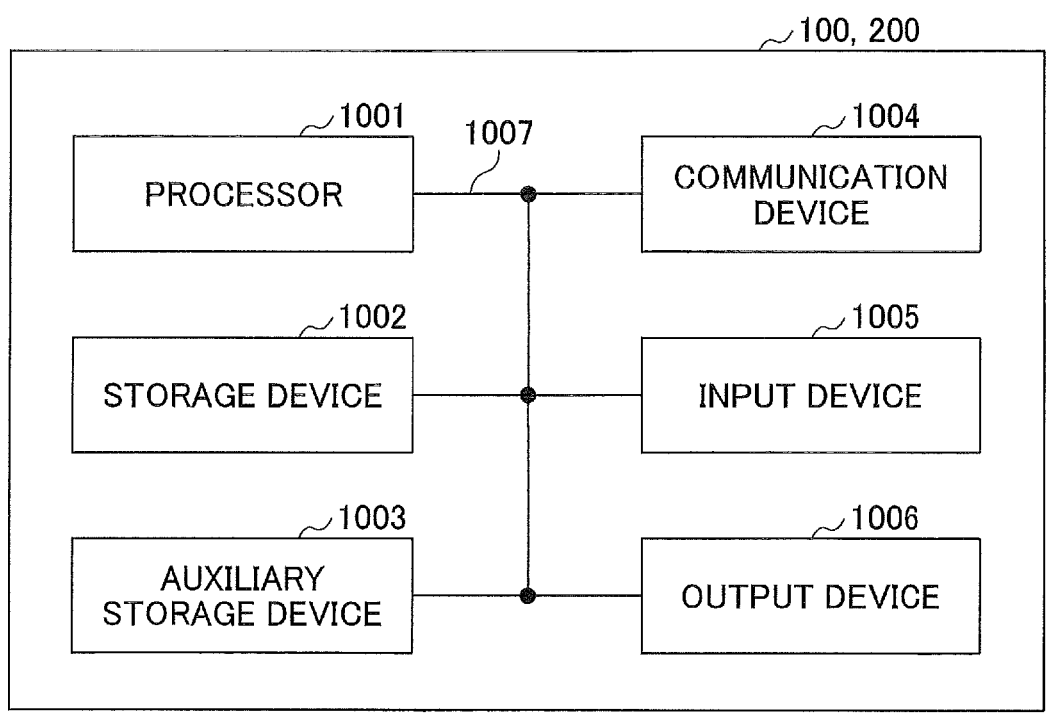
FIG. 12 is a diagram illustrating one example of a hardware arrangement of the base station apparatus 100 or the user device 200 in the embodiment of the present invention.

For example, the base station apparatus 100 and the user device 200 in one embodiment of the present invention may function as computers for performing processes related to the embodiment according to the present invention. FIG. 12 is a diagram illustrating one example of a hardware configuration of a radio communication device being the base station apparatus 100 or the user device 200 according to the embodiment of the present invention. Each of the base station apparatus 100 and the user device 200 described above can be configured physically as a computer device including a processor 1001, a storage device 1002, an auxiliary storage device 1003, a communication device 1004, an input device 1005, an output device 1006, a bus 1007 and the like.

Note that, in the following description, the term "apparatus" may be replaced with a circuit, device, unit and the like. The hardware configuration of the base station apparatus 100 and the user device 200 may be configured to include one or more of the respective devices illustrated in the figures and denoted at 1001-1006, or may be configured without including a part of the devices.

The respective functions in the base station apparatus 100 and the user device 200 are accomplished by reading predetermined software (programs) on hardware such as the processor 1001, the storage device 1002 and the like, performing calculation in the processor 1001, and controlling communication in the communication device 1004 and reading and/or writing of data in the storage device 1002 and the auxiliary storage device 1003.

For example, the processor 1001 causes an Operating System to operate so as to control the entire computer. The processor 1001 may be formed of a central processing unit (CPU: Central Processing Unit) including an interface with a peripheral device, control device, arithmetic unit, register, and the like.

Furthermore, the processor 1001 reads a program (program code), software module, or data from the auxiliary storage device 1003 and/or the communication device 1004 to the storage device 1002, and executes various processes in accordance with these. As the program, a program is used that is for causing a computer to execute at least a part of the operation described in the embodiment above. For example, the transmission unit 110, the reception unit 120, the configuration information management unit 130 and the initial access configuration unit 140 in the base station apparatus 100 illustrated in FIG. 10 may be implemented by a control program stored in the storage device 1002 and executed by the processor 1001. Also, for example, the transmission unit 210, the reception unit 220, the configuration information management unit 230 and the initial access control unit 240 in the user device 200 illustrated in FIG. 11 may be implemented by a control program stored in the storage device 1002 and executed by the processor 1001. It is described that the above-described various processes are performed by the single processor 1001, but they may be simultaneously or sequentially performed by two or more processors 1001. The processor 1001 may be implemented by one or more chips. Note that the program may be transmitted from a network through an electrical communication line.

The storage device 1002 is a computer readable recording medium, and may be formed of, for example, at least one of a ROM (Read Only Memory), EPROM (Erasable Programmable ROM), EEPROM (Electrically Erasable Programmable ROM), RAM (Random Access Memory) and the like. The storage device 1002 may be referred to as a register, cache, main memory (main storage device) and the like. The storage device 1002 can store a program (program code), software module and the like executable for performing processing according to one embodiment of the present invention.

The auxiliary storage device 1003 is a computer readable recording medium, and can be formed of, for example, at least one of an optical disc such as a CD-ROM (Compact Disc ROM), hard disk drive, flexible disc, magneto-optical disk (for example, compact disk, digital versatile disk, and Blu-ray (registered trademark) disk), smart card, flash memory (e.g., card, stick and key drive), floppy (registered trademark) disk, magnetic strip, and the like. The auxiliary storage device 1003 may be referred to as an auxiliary storage device. The above-described storage medium may be, for example, a database, server, or any other appropriate medium, including the storage device 1002 and/or the auxiliary storage device 1003.

The communication device 1004 is hardware (transmission/reception device) for executing communication between computers through a wired and/or wireless network, and is also referred to as, for example, a network device, network controller, network card, communication module, and the like. For example, the transmission unit 110 and the reception unit 120 in the base station apparatus 100 may be implemented by the communication device 1004. Also, the transmission unit 210 and the reception unit 220 in the user device 200 may be implemented by the communication device 1004.

The input device 1005 is an input device for receiving an input from the outside (e.g., a keyboard, mouse, microphone, switch, button, sensor and the like). The output device 1006 is an output device for implementing an output to the outside (e.g., a display, speaker, LED lamp and the like). Note that the input device 1005 and the output device 1006 may be configured to be integrated (for example, a touch panel).

Furthermore, the respective devices, such as the processor 1001 and the storage device 1002, are connected by the bus 1007 for communication of information. The bus 1007 may be formed of a single bus, or may be formed of different buses among the devices.

Furthermore, the base station apparatus 100 and the user device 200 may be constituted to include hardware, such as a microprocessor, digital signal processor (DSP: Digital Signal Processor), ASIC (Application Specific Integrated Circuit), PLD (Programmable Logic Device), FPGA (Field Programmable Gate Array), and the like. By the hardware, a part of or all of the functional blocks may be implemented. For example, the processor 1001 may be implemented by at least one of these hardware components.

Conclusion of the Embodiment

As has been described heretofore, according to the embodiment of the present invention, a user device for communication with a base station apparatus is provided, including a reception unit configured to receive a plurality of synchronization blocks and a PDCCH order from the base station apparatus, a control unit configured to select a synchronization block from the plurality of synchronization blocks for use in contention free random access based on the PDCCH order, and identify a random access preamble and a random access channel resource in a manner based on the PDCCH order, and a transmission unit configured to transmit the identified random access preamble to the base station apparatus by use of the selected synchronization block and the identified random access channel resource.

Owing to this configuration, the base station apparatus 100 can efficiently notify the user device 200 of a RACH resource and preamble index for use in contention free random access triggered by a PDCCH order. Also, the user device 200 can select an SSB for use in contention free random access among a plurality of SSBs. In short, a RACH resource for use in a random access procedure in NR can be notified to a user device appropriately.

A random access preamble and a random access channel resource corresponding to the selected synchronization block may be identified. Owing to this configuration, the user device 200 can identify a preamble index and RACH resource corresponding to the SSB for use.

The identified random access preamble and the identified random access channel resource may be identified by: a random access preamble index associated with each of the synchronization blocks; or a common index between synchronization blocks allocated to a random access channel resource, the random access preamble index and the common index being included in the PDCCH order. Owing to this configuration, the base station apparatus 100 can notify the user device 200 of a RACH resource and preamble index for use in contention free random access triggered by a PDCCH order, by use of a common index between the SSBs.

An information amount identifying a random access channel for use included in the PDCCH order may be changed in a manner based on a number of synchronization blocks associated with one random access channel resource. Owing to this configuration, the base station apparatus 100 can efficiently notify the user device 200 of a RACH resource for use in contention free random access triggered by a PDCCH order.

The selected synchronization block and the identified random access channel resource may be selected or identified by serial indexes allocated to random access channel resources associated with each of all the synchronization blocks included in the PDCCH order. Owing to this configuration, the base station apparatus 100 can efficiently notify the user device 200 of an SSB and a RACH resource for use in contention free random access triggered by a PDCCH order.

Upon receiving the PDCCH order, in a case where a random access channel is not configured in an active bandwidth part, a random access preamble may be transmitted in a default bandwidth part. Owing to this configuration, the user device 200 can identify a UL-BWP for transmitting a random access preamble in contention free random access triggered by a PDCCH order.

Also, according to the embodiment of the present invention, a base station apparatus for communication with a user device is provided, including a transmission unit configured to transmit one or a plurality of synchronization blocks and a PDCCH order to the user device, a configuration unit configured to identify a random access preamble and a random access channel resource corresponding to a synchronization block for use in contention free random access in a manner based on the PDCCH order, and a reception unit configured to receive the identified random access preamble from the user device by use of the identified random access channel resource.

Owing to this configuration, the base station apparatus 100 can efficiently notify the user device 200 of a RACH resource and preamble index for use in contention free random access triggered by a PDCCH order. In short, a RACH resource for use in a random access procedure in NR can be notified to a user device appropriately.

Supplement to the Embodiment

The embodiment of the present invention has been described above; however, the disclosed invention is not limited to the embodiment, and a person ordinarily skilled in the art will appreciate various variations, modifications, alternatives, replacements and the like. Specific examples of numerical values are used in the description in order to facilitate understanding of the invention, but these numerical values are merely examples, and any appropriate values may be used, unless otherwise indicated. Divisions of the described items in the above description are not essential to the present invention. Depending on necessity, subject matter described in two or more described items may be combined and used, and subject matter described in a described item may be applied to subject matter described in another described item (unless contradicted). A boundary of a functional component or a processor in the functional block diagrams may not necessarily correspond to a boundary of a physical part. An operation by a plurality of functional components may be physically executed by a single part, or an operation of a single functional component may be physically executed by a plurality of parts. In the processing procedures described in the embodiment, the order can be changed reversely, unless those are contradicted. For the convenience of description, the base station apparatus 100 and the user device 200 are described by using the functional block diagrams; however, such devices may be implemented in hardware, software, or combinations thereof. The software to be operated by the processor included in the base station apparatus 100 in accordance with the embodiment of the present invention, and the software to be operated by the processor included in the user device 200 in accordance with the embodiment of the present invention may be respectively stored in any appropriate storage medium, such as a random access memory (RAM), flash memory, read-only memory (ROM), EPROM, EEPROM, register, hard disk drive (HDD), removable disk, CD-ROM, database, server and the like.

Notification of information is not limited to the aspects/embodiment described in this specification, and may be given by any other methods. For example, the notification of information may be performed by physical layer signaling (for example, Downlink Control Information (DCI), Uplink Control Information (UCI)), higher layer signaling (for example, Radio Resource Control (RRC) signaling, Medium Access Control (MAC) signaling, broadcast information (Master Information Block (MIB), System Information Block (SIB))), or other signals, or a combination thereof. Further, the RRC signaling may be referred to as an RRC message and may be, for example, an RRC Connection Setup message, an RRC Connection Reconfiguration message, or the like.

Each of aspects/embodiment described in the present specification may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide-Band), Bluetooth (registered trademark), a system using other appropriate systems, and/or a next generation system extended based on these systems.

The processing procedures, the sequences, the flow charts and the like of the respective aspects/embodiment described in this specification may be reversed in order unless there is a contradiction. For example, the method described in this specification presents elements of various steps in an exemplary order and is not limited to a presented specific order.

A specific operation disclosed to be performed in the base station apparatus 100 in the present specification may be performed in an upper node in some cases. In a network composed of one or a plurality of network nodes having the base station apparatus 100, it is apparent that various operations that are performed for communication with the user device 200 can be performed by the base station apparatus 100 and/or another network node different from the base station apparatus 100 (e.g. MME or S-GW, though not limited thereto). Although the case where another network node different from the base station apparatus 100 is single is described in the example above, a combination of a plurality of other network nodes (e.g. MME and S-GW) may be used.

The respective aspects/embodiment disclosed in the present specification can be used singly, used in combination, and used by switching in operation.

The user device 200 can be also referred to by those skilled in the art as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client or several other appropriate terms.

The base station apparatus 100 may be referred to by those skilled in the art as NB (NodeB), eNB (evolved NodeB), gNB, base station (Base Station) or several other appropriate terms.

The terms "determining" and "determining" used in this specification may include a wide variety of actions. For example, "determining" and "determining" may include events in which events such as judging, calculating, computing, processing, deriving, investigating, looking up (for example, looking up in a table, a database, or another data structure), or ascertaining are regarded as "determining" or "determining." Further, "determining" and "determining" may include events in which events such as receiving (for example, receiving information), transmitting (for example, transmitting information), input, output, or accessing (for example, accessing data in a memory) are regarded as "determining" or "determining." Further, "determining" and "determining" may include events in which events such as resolving, selecting, choosing, establishing, or comparing are regarded as "determining" or "determining." In other words, "determining" and "determining" may include events in which a certain operation is regarded as "determining" or "determining."

As used in the present specification, the phrase "based on" does not mean "based only on" unless explicitly stated otherwise. In other words, the phrase "based on" means both "based only on" and "based on at least".

As long as the terms "include", "including", and variations thereof are used in the specification or claims, these terms are intended to be inclusive in a manner similar to the term "comprising". Furthermore, it is intended that the term "or" used in the specification or claims is not an "exclusive OR".

In the entirety of the present disclosure, if an article is added by translation, for example a, an and the in English, the elements with those articles can encompass a plurality of elements, unless otherwise indicated apparently in the context.

It is noted in the embodiment of the present invention that the initial access control unit 240 is one example of a control unit. The initial access configuration unit 140 is one example of a configuration unit. An SSB is one example of a synchronization block. A PDCCH order is one example of information for triggering contention free random access. A BWP is one example of a bandwidth part.

Although the present invention is described in detail heretofore, it is apparent to those skilled in the art that the present invention is not limited to the embodiment described in this specification. The present invention can be implemented as a modified and changed form without deviating from the spirit and scope of the present invention defined by the claims. Accordingly, the description of the present specification is given solely by way of illustration and does not have any restrictive meaning to the present invention.

REFERENCE SIGNS LIST 100 base station apparatus
110 transmission unit
120 reception unit
130 configuration information management unit
140 initial access configuration unit
200 user device
210 transmission unit
220 reception unit
230 configuration information management unit
240 initial access control unit
1001 processor
1002 storage device
1003 auxiliary storage device
1004 communication device
1005 input device
1006 output device

The invention claimed is:

1. A terminal comprising:
a receiver that receives synchronization blocks and an indication triggering contention free random access from a base station apparatus;
a processor that identifies a synchronization block, a random access preamble and a random access channel occasion for use in the contention free random access based on the indication triggering contention free random access; and
a transmitter that transmits the identified random access preamble to the base station apparatus by use of the identified synchronization block and the identified random access channel occasion.

2. The terminal as claimed in claim 1, wherein the processor identifies the random access channel occasion from random access channel occasions mapped to indexes prioritizing frequency domain first and time domain second based on one of the indexes included in the indication triggering contention free random access, and wherein each of the indexes indicates a synchronization block.

3. The terminal as claimed in claim 1, wherein, when the contention free random access is triggered, the transmitter sends a random access channel by use of an initial BWP (Bandwidth part) in a case that no random access channel occasion is configured for an active uplink BWP.

4. The terminal as claimed in claim 1, wherein the processor calculates RA-RNTI (Random Access-Radio Network Temporary Identifier) by use of a frequency index in an uplink BWP where a random access channel has been transmitted, and the receiver receives a random access response by use of the RA-RNTI from the base station apparatus.

5. The terminal as claimed in claim 1, wherein, when the receiver receives a random access response from the base station apparatus, the transmitter sends an uplink shared channel on an active uplink BWP based on uplink scheduling information included in the random access response.

6. A base station apparatus comprising:
a transmitter that transmits synchronization blocks and an indication triggering contention free random access including information indicating a synchronization block, a random access preamble and a random access channel occasion for use in the contention free random access to a terminal; and
a receiver that receives the random access preamble from the terminal by use of the random access channel occasion.

* * * * *